United States Patent
Kano et al.

(10) Patent No.: US 10,156,930 B2
(45) Date of Patent: Dec. 18, 2018

(54) TOUCH PANEL AND ELECTRONIC DEVICE

(71) Applicant: Murata Manufacturing Co., Ltd., Nagaokakyo-shi, Kyoto-fu (JP)

(72) Inventors: Hidekazu Kano, Nagaokakyo (JP); Kenichi Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 95 days.

(21) Appl. No.: 15/244,445

(22) Filed: Aug. 23, 2016

(65) Prior Publication Data
US 2016/0357331 A1  Dec. 8, 2016

Related U.S. Application Data

(63) Continuation of application No. PCT/JP2015/060436, filed on Apr. 2, 2015.

(30) Foreign Application Priority Data

Apr. 7, 2014  (JP) ................................ 2014-078332
Oct. 15, 2014  (JP) ................................ 2014-210882

(51) Int. Cl.
*G06F 3/041* (2006.01)
*G06F 3/044* (2006.01)
*G02F 1/1333* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/044; G06F 3/0412; G06F 3/0414; G06F 3/0416; G06F 2203/04105; G06F 2203/04107; G02F 1/13338
(Continued)

(56) References Cited

U.S. PATENT DOCUMENTS 7,868,778 B2 * 1/2011 Kenwright .............. G06F 3/044
340/539.23
9,348,473 B2  5/2016 Ando
(Continued)

FOREIGN PATENT DOCUMENTS

WO  WO 2013/021835 A1  2/2013
WO  WO 2013021835 A  *  2/2013
WO  WO 2014/045847 A1  3/2014

OTHER PUBLICATIONS

International Search Report issued in International Patent Application No. PCT/JP2015/060436 dated Jun. 16, 2015.
(Continued)

*Primary Examiner* — Prabodh M Dharia
(74) *Attorney, Agent, or Firm* — Arent Fox LLP

(57) ABSTRACT

A touch panel includes a capacitive touch panel unit and a pressure sensor unit. The capacitive touch panel unit includes a film and touch panel electrodes, and the pressure sensor unit includes a film and pressure sensor electrodes. An electrode layer in which the pressure sensor electrode is formed is the same as an electrode layer in which the touch panel electrode is formed. An electrode layer in which the pressure sensor electrode is formed has a non-formation portion where the pressure sensor electrode is not formed at the position opposite to the touch panel electrode.

20 Claims, 12 Drawing Sheets

(52) U.S. Cl.
CPC ........ *G06F 3/0414* (2013.01); *G02F 1/13338* (2013.01); *G06F 2203/04105* (2013.01); *G06F 2203/04107* (2013.01)

(58) Field of Classification Search
USPC ................. 345/156–184; 349/42; 381/55
See application file for complete search history.

(56) References Cited

U.S. PATENT DOCUMENTS

| | | | | |
|---|---|---|---|---|
| 2007/0030221 | A1* | 2/2007 | Pak | G02F 1/13338 345/87 |
| 2008/0129898 | A1* | 6/2008 | Moon | G02F 1/13338 349/12 |
| 2009/0303400 | A1* | 12/2009 | Hou | G06F 3/0412 349/12 |
| 2011/0063537 | A1* | 3/2011 | Kim | G02F 1/13338 349/42 |
| 2011/0310059 | A1* | 12/2011 | Miyamoto | G06F 3/0412 345/174 |
| 2012/0062245 | A1* | 3/2012 | Bao | H01L 29/84 324/661 |
| 2012/0068965 | A1* | 3/2012 | Wada | G06F 3/0414 345/174 |
| 2012/0075226 | A1* | 3/2012 | Andoh | G06F 3/0414 345/173 |
| 2013/0082970 | A1* | 4/2013 | Frey | G06F 3/0414 345/173 |
| 2013/0108061 | A1* | 5/2013 | Ando | G06F 3/0433 381/55 |
| 2014/0152618 | A1* | 6/2014 | Ando | G06F 3/044 345/174 |
| 2014/0204051 | A1* | 7/2014 | Park | G06F 3/0412 345/174 |
| 2014/0347304 | A1* | 11/2014 | Ando | G06F 3/041 345/173 |
| 2014/0361980 | A1* | 12/2014 | Iwaki | G06F 3/14 345/156 |
| 2015/0042590 | A1* | 2/2015 | Ando | G06F 3/0354 345/173 |
| 2015/0193055 | A1 | 7/2015 | Ando | |
| 2015/0277558 | A1* | 10/2015 | Hamm | G06F 3/013 345/156 |
| 2016/0109983 | A1 | 4/2016 | Ando | |
| 2016/0179276 | A1* | 6/2016 | Nathan | G06F 3/0414 345/174 |
| 2016/0239127 | A1* | 8/2016 | Kano | G06F 3/0488 |
| 2016/0364057 | A1* | 12/2016 | Chi | G06F 3/0414 |
| 2017/0336894 | A1* | 11/2017 | Nelson | G06K 9/0002 |

OTHER PUBLICATIONS

Written Opinion issued in International Patent Application No. PCT/JP2015/060436 dated Jun. 16, 2015.

* cited by examiner (Second in-plane direction)

(First in-plane direction)

(Thickness direction)

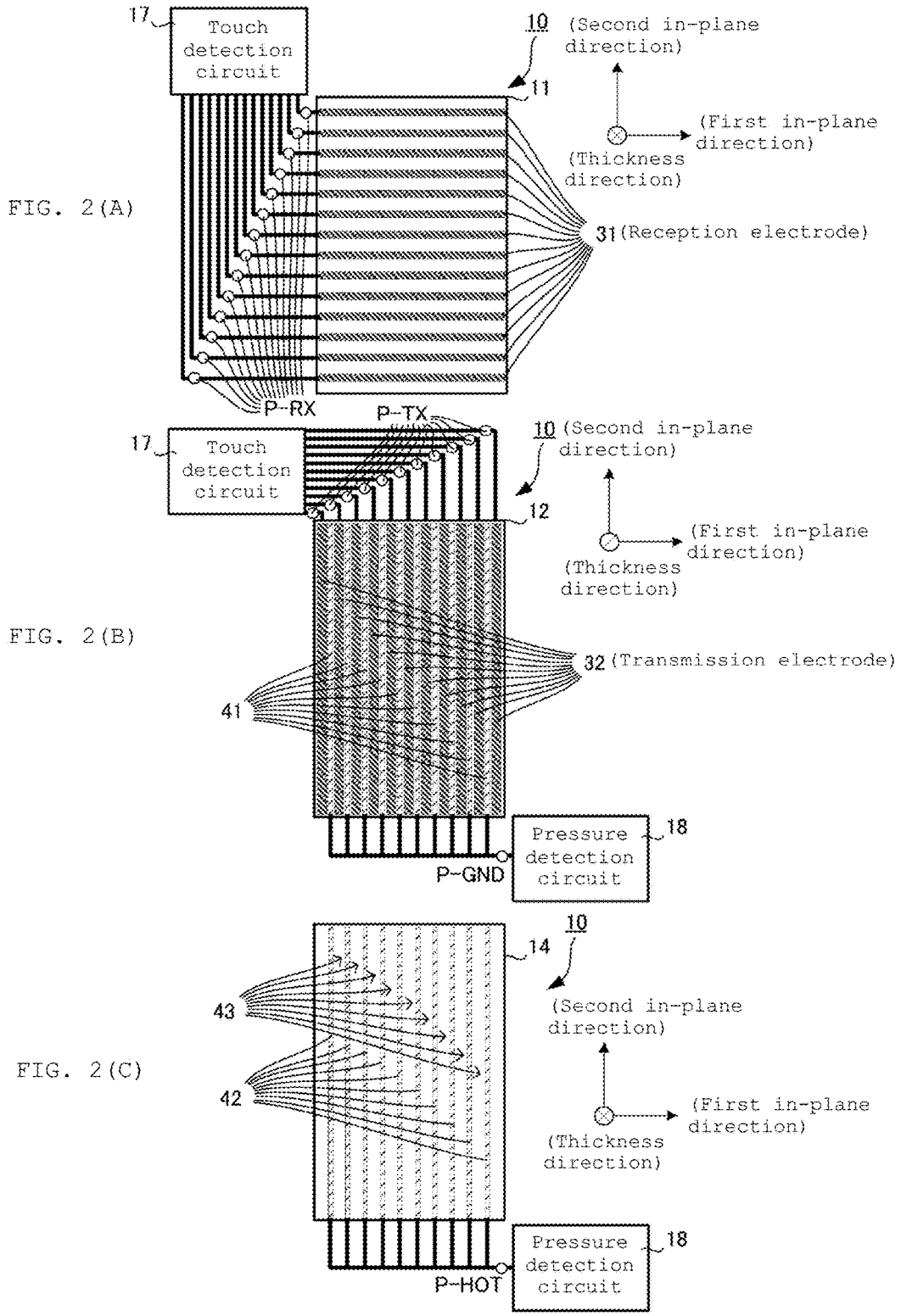

(Second in-plane direction)
(First in-plane direction)
(Thickness direction)

(Second in-plane direction)
(First in-plane direction)
(Thickness direction)

FIG. 13
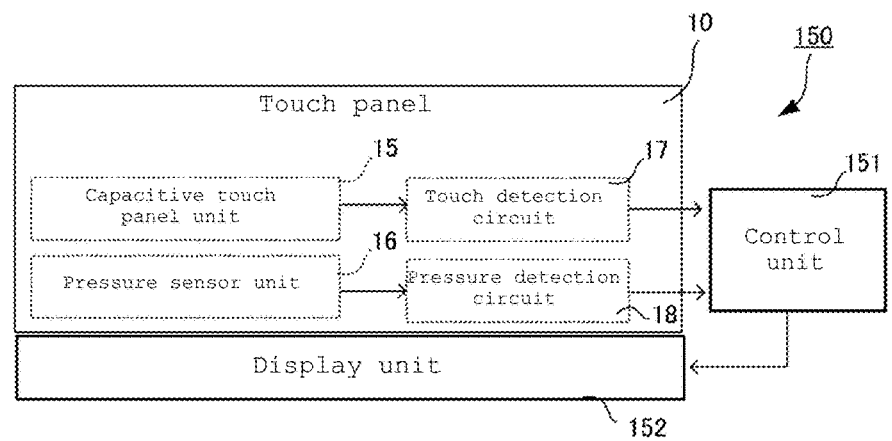
FIG. 14
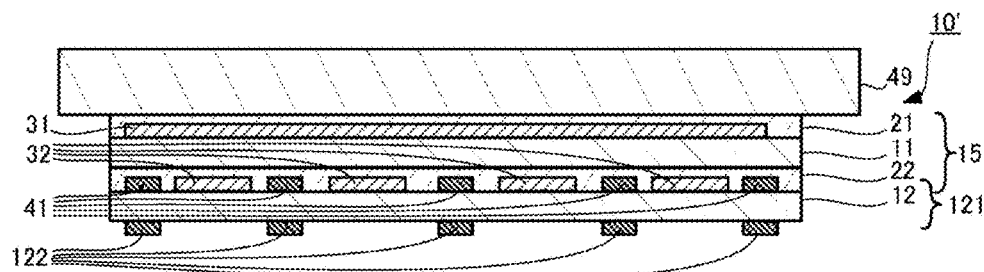
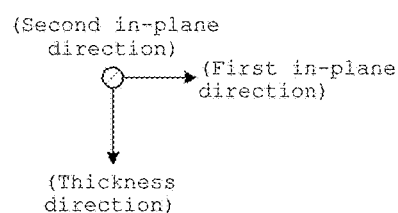

PRIOR ART

TOUCH PANEL AND ELECTRONIC DEVICE

CROSS REFERENCE TO RELATED APPLICATION

The present application is a continuation of International application No. PCT/JP2015/060436, filed Apr. 2, 2015, which claims priority to Japanese Patent Application No. 2014-210882, filed Oct. 15, 2014, which claims priority to Japanese Patent Application No. 2014-078332, filed Apr. 7, 2014, the entire contents of which is incorporated herein by reference.

TECHNICAL FIELD

The present invention relates to a technique of simultaneously detecting a position (touch position) touched with fingers or the like on an operation surface and pressing with fingers or the like on the operation surface of a touch panel.

BACKGROUND ART

Conventionally, various touch panels which can simultaneously detect a touch position and a pressing force have been proposed. For example, WO 2013/021835 A discloses a touch panel configured such that a pressure sensor unit for detecting a pressing force is overlaid on a capacitive touch panel unit for detecting a touch position.

FIG. 16(A) is a side sectional view schematically illustrating the touch panel of WO 2013/021835. The touch panel 300 includes a plurality of films 301, 302, 303, 304, and 305. The films 301, 302, 303, 304, and 305 are laminated in order from a top surface to a bottom surface, and are bonded to each other with an adhesive sheet interposed therebetween.

The films 301 and 302 form a capacitive touch panel unit. A plurality of touch panel electrodes 311 are provided on the top surface of the film 301. A plurality of touch panel electrodes 312 are provided on the top surface of the film 302. The touch panel electrodes 311 and the touch panel electrodes 312 are arranged to cross each other in a two-dimensional lattice viewed from the top surface of the display panel. When a finger or the like approaches the touch panel 300 while a pulse signal is applied between each of the touch panel electrodes 312 and each of the touch panel electrodes 311, capacitance between the touch panel electrode 312 and the touch panel electrode 311 changes in the vicinity of the touch position. As a result, the touch position can be detected by detecting the change in the capacitance.

The films 303, 304, and 305 form a pressure sensor unit. Specifically, a pressure sensor electrode 313 is provided on the entire top surface of the film 303. A pressure sensor electrode 314 is provided on the entire top surface of the film 305. The film 304 is made of a material having piezoelectricity for generating charges on the top surface and the bottom surface as a function of the extension and contraction of the film 304 in the in-plane direction. When the touch panel 300 is pressed with a finger or the like, charges are generated on the top and bottom surfaces of the film 304 and a potential difference is created between the pressure sensor electrode 313 and the pressure sensor electrode 314. Accordingly, the pressing force can be detected by detecting the potential difference between the pressure sensor electrode 313 and the pressure sensor electrode 314.

SUMMARY OF THE INVENTION

Problem to be Solved by the Invention

As the total number of films in a touch panel increases, the thickness of the touch panel also increases. When the touch panel is made translucent, electrodes or films need to be formed of a material having high translucency. However, when the total number of films is large, the translucency of the touch panel as a whole is reduced.

FIG. 16(B) is a side sectional view schematically illustrating an example of a configuration of a touch panel with fewer films. The touch panel 300A includes a plurality of films 301, 302A, 304, and 305. A plurality of touch panel electrodes 312 that become part of a capacitive touch panel unit and a plurality of pressure sensor electrodes 313A that become part of a pressure sensor unit are alternately provided on the top surface of the film 302A in parallel with one another. The configuration in which a part of the electrodes of the capacitive touch panel unit and a part of the electrodes of the pressure sensor unit are provided on the same film as described above can decrease the total number of films.

However, when the touch panel 300A is configured this way, the capacitive touch panel unit and the pressure sensor unit are very close to each other, and this may cause an electrical connection between the capacitive touch panel unit and the pressure sensor unit. When this happens, a pulse signal driving the capacitive touch panel unit leaks to the pressure sensor unit as noise, deteriorating the accuracy with which the pressing force may be detected.

The present invention aims to provide a technique of enhancing the precision with which the pressing force is detected, even if the total number of films is decreased in a touch panel.

Means for Solving the Problem

The present invention relates to a touch panel comprising a capacitive touch panel unit and a pressure sensor unit.

In the preferred embodiment, the touch panel includes a capacitive unit having first and second sets of touch panel electrodes separated by a dielectric flat film. The first and second touch panel electrodes lie in first and second planes, respectively. The individual electrodes of the second set extending parallel to one another with respective gaps located between them. A pressure sensor unit includes first and second sets of parallel pressure sensor electrodes separated by a piezoelectric flat film and lying in the second and a third plane, respectively. Each pressure sensitive electrodes of the first set is located in a respective one of the gaps between the individual touch panel electrodes of the second set and opposes a respective pressure sensitive electrode of the first set with the piezoelectric film located there between so as to define an opposing pair of pressure sensitive electrodes.

With this configuration, capacitance between the first touch panel electrode and the second touch panel electrode is changed due to an approach of a finger or the like to the touch panel, whereby a touch position can be detected from the change in the capacitance. A potential difference is generated between the first pressure sensor electrode and the second pressure sensor electrode with the pressing of the touch panel, whereby pressing can be detected based on the potential difference. In addition, the second touch panel electrode on the capacitive touch panel unit and the first pressure sensor electrode on the pressure sensor unit are provided in the same electrode layer, whereby the total number of films in the touch panel can be reduced.

In the preferred embodiment there is a respective gap in the third plane between each adjacent pairs of second pressure sensor electrodes and there is no active electrode formed in those gaps. Those gaps oppose the second touch panel electrodes. This can prevent the drive signal of the capacitive touch panel unit from leaking to the pressure sensor unit as noise, and therefore, precision of the detection of the pressing can be enhanced.

It is preferable that the second pressure sensor electrodes are provided except for the region opposite to the second touch panel electrodes. With this, the precision in detecting the pressing can further be enhanced.

The touch panel according to the present invention may include a pressure detection circuit having a first connection end connected to the first pressure sensor electrode and a second connection end connected to the second pressure sensor electrode. In this case, the first connection end in the pressure detection circuit preferably has a ground potential.

This configuration can prevent deterioration in detection precision of a touch position caused by leakage of noise from the pressure detection circuit to the touch detection circuit.

Preferably, in the touch panel according to the present invention, at least two of the opposing pairs of pressure sensitive electrodes are coupled to the pressure detection circuit in parallel to one another. With this configuration, a voltage value of pressure detection voltage inputted to the pressure detection circuit increases, whereby pressure detection sensitivity can be enhanced.

In the touch panel according to the present invention, the outer shape of the first film unit and the outer shape of the second film unit may be identical to each other, the first film unit and the second film unit may have a longitudinal direction and a lateral direction, and the two or more of the first pressure sensor electrodes and the two or more of the second pressure sensor electrodes may extend in the longitudinal direction. With this construction the piezoelectric film is rectangular in shape and extends in a longitudinal direction and a lateral direction and the first and second sets of pressure sensitive electrodes extend in the longitudinal direction.

In this case, it is preferably that first and second pressure detection circuits be provided and that a first plurality of opposing pairs of pressure sensitive electrodes are connected to the first pressure detection circuit and a second plurality of opposing pairs of pressure sensitive electrodes are connected to the second pressure detection circuit. The location of the first plurality of opposing pairs of pressure sensitive electrodes is closer to the middle of the piezoelectric film in the longitudinal direction than the location of the second plurality of pairs of pressure sensitive electrodes.

With the above structure, polarity inversion can locally occur on charges generated on the second film, depending on a position where pressing force is applied. Especially when the second film has a rectangular outer shape, polarity inversion of charges is likely to occur near the long (longitudinal) sides of the second film (the charge inversion region). When the pairs of opposing electrodes are collectively connected to the pressure detection circuit, pressure detection voltages are offset, and pressure detection sensitivity is sometimes deteriorated. In order to ameliorate some of these adverse effects, the pressure sensor electrodes are preferable connected to different pressure detection circuits as described above. This configuration can prevent the pressure detection voltages from being offset. Alternatively, at least some of the second pressure sensitive electrodes located in the inversion region have sections with narrowed widths. This configuration can prevent the influence of the portion where the polarity inversion of charges occurs, whereby the voltage values of the pressure detection voltages can be stabilized.

Preferably, the second film in the touch panel according to the present invention is made of polylactic acid which has been subjected to a stretching process in at least uniaxial direction.

Uniaxially stretched polylactic acid has high piezoelectric constant. Therefore, use of polylactic acid as the material of the second film can increase detection sensitivity of pressing force. In addition, polylactic acid has high translucency, whereby a touch panel having high translucency can be implemented. Since polylactic acid has no pyroelectricity, detection precision of pressing force is not affected, even if body temperature is propagated when a finger or the like touches the front surface of the touch panel. Accordingly, when polylactic acid is used as the material of the second film, there is no need to employ a complex mechanism, which is for indirectly transmitting pressing force so as not to transmit body temperature, compared to the case where a material having pyroelectricity such as PVDF is used.

If the electrode width of the first pressure sensor electrodes is smaller than the electrode width of the second pressure sensor electrodes in the touch panel according to the present invention, the generation of the problem of variation in performance can be suppressed, the problem being generated due to variation in opposing area of the first pressure sensor electrode and the second pressure sensor electrode according to production tolerance. In addition, the space between the first pressure sensor electrode and the second touch sensor electrode, which are formed in the same electrode layer, can be increased, whereby floating capacitance generated between both electrodes can be reduced. With this, the leakage of noise from the capacitive touch panel unit to the pressure sensor unit can be suppressed.

If the electrode width of the second pressure sensor electrode is smaller than the electrode width of the first pressure sensor electrode in the touch panel according to the present invention, the generation of the problem of variation in performance can be suppressed, the problem being generated due to variation in opposing area of the first pressure sensor electrode and the second pressure sensor electrode according to production tolerance.

The touch panel according to the present invention preferably further includes a ground electrode formed in the same electrode layer as the first pressure sensor electrodes and the second touch panel electrode (i.e., the second plane), the ground electrode being formed between the first pressure sensor electrode and the second touch panel electrode. With this structure, floating capacitance generated between the first pressure sensor electrode and the second touch sensor electrode, which are formed in the same electrode layer, can be reduced, whereby the leakage of noise from the capacitive touch panel unit to the pressure sensor unit can be suppressed.

The touch panel according to the present invention preferably further includes a dummy electrode that is electrically isolated from the other electrodes and is located opposite to the second touch panel electrode, the dummy electrode being formed in the same electrode layer as the second pressure sensor electrode (i.e., the third plane). This can allow the number of laminated layers of each electrode to be equal to one another, whereby variation (color unevenness) of translucency visually recognized when the touch panel is viewed from the operation surface can be reduced.

In the touch panel according to the present invention, it is preferable that at least one of the first pressure sensor electrode, the second pressure sensor electrode, the first touch panel electrode, and the second touch panel electrode has a plurality of linear electrode portions in the electrode layer in which the corresponding electrode is formed, the linear electrode portions extending in parallel with one another with an electrode width and arrangement space which are equal to those of the other electrodes. With this, the electrode is difficult to be visually recognized from the outside.

An electric device in accordance with the present invention includes the touch panel described above and a control unit receiving an output from the touch panel as an operation signal.

Effects of the Invention

According to the present invention, pressing can be detected with high precision, even if a thickness of a touch panel is reduced.

BRIEF EXPLANATION OF DRAWINGS

FIGS. 2(A)-2(C) are plan views illustrating films of the touch panel according to the first embodiment of the present invention.

FIG. 13 is a block diagram illustrating an electronic device according to a tenth embodiment of the present invention.

FIG. 14 is a side sectional view illustrating a touch panel according to a modification of the first embodiment.

MODE FOR CARRYING OUT THE INVENTION

A touch panel according to a first embodiment of the present invention will be described with reference to the drawings. In the description below, one principal surface of each film is referred to as a "top surface", and the opposite principal surface of each film is referred to as a "bottom surface".

Figure 1:
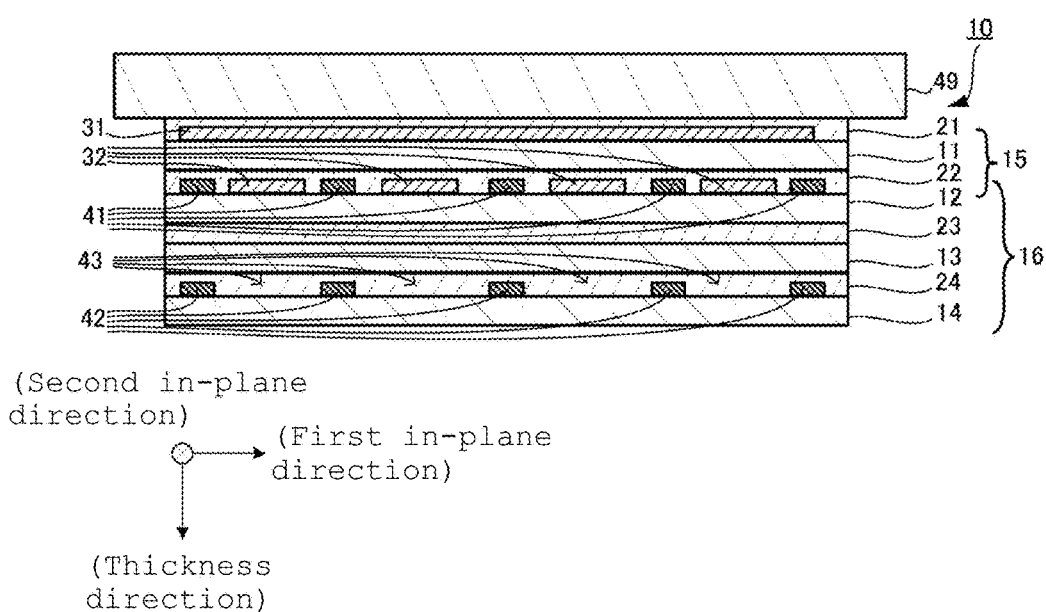
FIG. 1 is a side sectional view illustrating a touch panel according to a first embodiment of the present invention.

FIG. 1 is a side sectional view illustrating a touch panel 10 according to the first embodiment of the present invention. FIGS. 2(A) to 2(C) are plan views illustrating an electrode pattern of each film in the touch panel 10. The electrode patterns illustrated in FIGS. 2(A) to 2(C) are only illustrative, and the number and shape of each electrode can be changed as desired.

The touch panel 10 is preferably adhered to a non-conductive elastic plate such as glass, acrylic, or polycarbonate. In the present embodiment, the touch panel 10 is adhered onto a back surface of a cover glass 49 of a display unit in an electronic device for detecting a touch and a pressing operation on the front surface of the cover glass 49 with an operator's finger, or the like.

The touch panel 10 includes films 11, 12, 13, and 14, adhesive sheets 21, 22, 23, and 24, touch panel electrodes 31 and 32, pressure sensor electrodes 41 and 42, a touch detection circuit 17 (see FIG. 2(A)), and a pressure detection circuit 18 (see FIG. 2(C)).

The adhesive sheets 21, 22, 23, and 24 and the films 11, 12, 13, and 14 are flat, and alternately laminated from the top surface toward the bottom surface. The adhesive sheet 21 is adhered on the top surface of the film 11 for bonding the touch panel 10 to the cover glass 49. The adhesive sheet 22 is adhered between the top surface of the film 12 and the bottom surface of the film 11. The adhesive sheet 23 is adhered between the top surface of the film 13 and the bottom surface of the film 12. The adhesive sheet 24 is adhered between the top surface of the film 14 and the bottom surface of the film 13.

The films 11 to 14 and the adhesive sheets 21 to 24 are preferably rectangular in shape, and the outer shapes of the films and adhesive sheets are identical as viewed from the top surfaces. Each of them has a short side along a first in-plane direction and a long side along a second in-plane direction. The first in-plane direction and the second in-plane direction are mutually orthogonal, when the touch panel 10 is viewed from the top surface.

The film 11 is preferably made of a dielectric translucent material, such as PET, and has the touch panel electrodes 31 provided on its top surface. The film 12 is made of a translucent material, such as PET, and has the touch panel electrodes 32 and the pressure sensor electrodes 41 provided on its top surface. The film 13 is made of a translucent material having predetermined piezoelectricity. The film 14 is made of a translucent material, such as PET, and has the pressure sensor electrodes 42 provided on its top surface.

The touch panel electrodes 31 are formed on the top surface of the film 11 preferably with the pattern illustrated in FIG. 2(A). The touch panel electrodes 32 and the pressure sensor electrodes 41 are formed on the top surface of the film 12 preferably with the pattern illustrated in FIG. 2(B). The pressure sensor electrodes 42 are formed on the top surface of the film 14 preferably with the pattern illustrated in FIG. 2(C).

It is preferable to use any one of an organic electrode mainly made of ITO, ZnO, or polythiophene, an organic electrode mainly made of polyaniline, an electrode using silver nanowire, and an electrode using carbon nanotube, for the touch panel electrodes 31 and 32 and the pressure sensor electrodes 41 and 42. A highly translucent electrode pattern can be formed by using these materials. These materials are preferably formed on each of the films 11, 12, and 14 with vapor deposition, sputtering, or plating. If transparency is not required, a metal electrode or silver paste electrode formed using a material other than the above materials with a process different from the above process can be used.

The films 11 and 12, the touch panel electrodes 31, the touch panel electrodes 32, and the touch detection circuit 17 form a capacitive touch panel unit 15. The capacitive touch panel unit 15 is formed by allowing the touch panel electrodes 31 and 32 to oppose each other across the film 11. Therefore, the film 11 corresponds to a first film unit. Each of the touch panel electrodes 31 corresponds to a first touch panel electrode. Each of the touch panel electrodes 32 corresponds to a second touch panel electrode.

More specifically, a plurality of touch panel electrodes 31 are provided on the top surface of the film 11 as best shown in FIG. 2(A). Each touch panel electrode 31 extends in a predetermined in-plane direction (in the first in-plane or horizontal direction as viewed in FIG. 2(A)) and are arranged parallel to one another. More particularly, each touch panel electrode 31 is elongated in the first in-plane direction and is spaced apart from the remaining touch panel electrodes in a second in-plane direction (the vertical direction as viewed in FIG. 2(A)).

A plurality of touch panel electrodes 32 are provided on the top surface of the film 12 (see FIG. 2(B)). Each of the touch panel electrodes 32 extends in the second in-plane direction (the vertical direction as viewed in FIG. 2(B)) and are arranged parallel to and spaced from one another. The touch panel electrodes 32 extend in a direction perpendicular to the touch panel electrodes 31 so as to intersect the touch panel electrodes 31 in a two-dimensional lattice. The touch panel electrodes 31 and the touch panel electrodes 32 are separated from one another by the thickness of the film 11.

A touch detection circuit 17 includes a plurality of first connection terminals P-RX and a plurality of second connection terminals P-TX. Each of the touch panel electrodes 31 is connected to a respective first connection terminal P-RX. Each of the touch panel electrodes 32 is connected to a respective second connection terminals P-TX. The touch detection circuit 17 applies a drive signal to the touch panel electrodes 32 through the second connection terminals P-TX. Therefore, the touch panel electrodes 32 correspond to so-called transmission electrodes in the capacitive touch panel unit 15. The touch detection circuit 17 also connects the touch panel electrodes 31 to a reference potential relative to the drive signal through the first connection terminals P-RX. Accordingly, the touch panel electrodes 31 correspond to so-called reception electrodes in the capacitive touch panel unit 15.

When the drive signal is applied to the touch panel electrodes 32, an electric field is generated around the touch panel electrodes 32 such that at least a part of electric lines of force extends through the cover glass 49 onto the front surface. Therefore, when an operator touches the front surface of the cover glass 49 with his/her finger, the electric field near the touch position is changed, so that capacitance between each of the touch panel electrodes 31 and each of the touch panel electrodes 32 is changed in the vicinity of the touch position. With this, the touch detection circuit 17 detects an associated pair of the touch panel electrodes 31 and 32 which cause the change in the capacitance. This allows the touch detection circuit 17 to determine the location of the touch position as a function of the location of this crossing pair of electrodes.

The films 12, 13, and 14, the pressure sensor electrodes 41 and 42, and the pressure detection circuit 18 form a pressure sensor unit 16. As best shown in FIG. 1, the pressure sensor unit 16 is formed such that the piezoelectric film 13 is sandwiched between the films 12 and 14 on which pressure sensor electrodes 41 and 42 are respectively formed. The piezoelectric film 13 corresponds to a second film unit. A pressure sensor electrode 41 corresponds to a first pressure sensor electrode, and the pressure sensor electrode 42 corresponds to a second pressure sensor electrode.

In the present embodiment, the piezoelectric film 13 is preferably made of uniaxially-stretched poly L-lactic acid (PLLA). The film 13 may be made of uniaxially-stretched poly D-lactic acid (PDLA). The outer shape of the film 13 is set such that the short side and the long side (the first and second in-plane directions, respectively have an angle of approximately 45 degrees relative to the uniaxial stretching direction. An angle of approximately 45 degrees means angles including the range of about 45°±10°. This angle is a design matter that should be determined according to the desired precision in detecting a pressing force.

PLLA composing the piezoelectric film 13 is preferably a chiral polymer, and its main chain has a helical structure. When uniaxially stretched to allow molecules to be oriented, PLLA exhibits a piezoelectric characteristic. The piezoelectric constant of the uniaxially-stretched PLLA belongs to a higher category among piezoelectric constants of various polymers.

The stretch ratio of PLLA is preferably about 3 to 8. When heat treatment is performed after the stretching of PLLA, crystallization of an extended chain crystal of polylactic acid is accelerated to improve the piezoelectric constant. PLLA may be biaxially stretched. In such case, the effect similar to the uniaxial stretching can be obtained by using different stretch ratio for each axis to be stretched. For example, a certain direction is specified as an X axis. When a film is stretched 8 times in the X direction, and 2 times in a Y axis direction orthogonal to the X axis, the effect is similar to the effect of the case where a film is uniaxially stretched about 4 times in the X axis direction can be obtained for a piezoelectric constant. A film simply uniaxially stretched is likely to be torn along the direction of the stretching axis. When the biaxial stretching described above is performed, the strength of the film can be increased.

PLLA generates piezoelectricity with a molecular orientation process such as stretching, so that it does not need a polling process that is required by other polymers such as PVDF or piezoelectric ceramics. Specifically, piezoelectricity of PLLA that does not belong to ferroelectrics is not exhibited with polarization of ions as in ferroelectrics such as PVDF or PZT, but is derived from a helical structure which is a characteristic structure of the molecule. With this, pyroelectricity which is generated on a piezoelectric body of other ferroelectric is not generated on PLLA. In addition, a piezoelectric constant of PVDF varies with time, and in some cases, the piezoelectric constant is significantly reduced. On the other hand, the piezoelectric constant of PLLA is extremely stable with time.

PLLA has extremely low relative permittivity such as about 2.5. Therefore, when d is specified as a piezoelectric constant, and $\varepsilon T$ is specified as a dielectric constant, a piezoelectric output constant (=piezoelectric g constant, $g=d/\varepsilon T$) becomes large. Here, the piezoelectric g constant of PVDF having dielectric constant $\varepsilon 33T=13\times\varepsilon 0$ and piezoelectric constant $d31=25$ pC/N becomes $g31=0.2172$ Vm/N from the above equation. On the other hand, when the piezoelectric g constant of PLLA having piezoelectric constant $d14=10$ pC/N is obtained in terms of $g31$, $d31=5$ pC/N because $d14=2\times d31$. Therefore, the piezoelectric g constant becomes $g31=0.2258$ Vm/N. Accordingly, pressure detection sensitivity similar to PVDF can be sufficiently obtained with PLLA having piezoelectric constant $d14=10$ pC/N. The inventors of the present invention have experimentally obtained PLLA with d14=15 to 20 pC/N. By using this PLLA, the pressing force can be detected with much higher sensitivity.

As best shown in FIG. 2(B), a plurality of pressure sensor electrodes 41 are provided on the top surface of film 12 in between adjacent pairs of the touch panel electrodes 32. A space is provided between each pressure sensor electrode 41 and its adjacent pair of touch panel electrodes 32. The pressure sensor electrodes 41 are elongated and extend in the second in-plane direction (i.e., vertically as viewed in FIG. 2(B) and run parallel with respect to one another. They also run parallel to (but spaced from) the touch panel electrodes 32.

As best shown in FIG. 2(C) a plurality of pressure sensor electrodes 42 are provided on the top surface of the film 14 at locations which oppose respective pressure sensor electrodes 41 across the film 12 and at locations which avoid the region opposite to the touch panel electrodes 32 provided on the top surface of the film 12. More particularly, electrode non-formation portions 43 are formed on the top surface of the film 14 in the regions which oppose the touch panel electrodes 32. The pressure sensor electrodes 42 are provided such that the electrode non-formation portion 43 is sandwiched between the pressure sensor electrodes 42 as viewed in FIG. 2(C). Each of the pressure sensor electrodes 42 is elongated in the second in-plane direction (i.e., in the vertical direction as viewed in FIG. 2(C)) and is spaced apart from adjacent pressure sensitive electrodes 42 in the first in-plane direction (i.e., in the horizontal direction as viewed in FIG. 2(C)). The outer shapes and arrangement of the pressure sensor electrodes 42 are identical to those of the pressure sensor electrodes 41 as viewed from the top surface.

A pressure detection circuit 18 includes a first connection end P-GND and a second connection end P-HOT. A plurality of the pressure sensor electrodes 41 are collectively connected to the first connection end P-GND. A plurality of the pressure sensor electrodes 42 are collectively connected to the second connection end P-HOT. Therefore, all pairs of the opposing pressure sensor electrode 41 and the pressure sensor electrode 42 are connected in parallel to the pressure detection circuit 18. The first connection end P-GND of the pressure detection circuit 18 is connected to a ground potential.

With the pressure sensor unit 16 thus configured, when the front surface of the cover glass 49 is locally pressed with an operator's finger or the like, the piezoelectric film 13 is distorted in the thickness direction (i.e., perpendicular to the plane on which FIGS. 2(A)-2(C) are drawn) around the pressed part, generating tensile stress in the in-plane direction of the piezoelectric film 13. Then, PLLA composing the piezoelectric film 13 is polarized to generate charges on its top surface and the bottom surfaces. The charges are concentrated on the pressure sensor electrodes 41 facing the top surface of the piezoelectric film 13 and the pressure sensor electrodes 42 facing the bottom surface of the piezoelectric film 13 due to electrostatic induction, whereby a potential difference is generated between the pressure sensor electrodes 41 and the pressure sensor electrodes 42. A pressing operation can be detected by detecting this potential difference (hereinafter referred to as pressure detection voltage) using the pressure detection circuit 18. In the present embodiment, PLLA having larger piezoelectric constant d14 is preferably used for the piezoelectric film 13. Therefore, the voltage value of the pressure detection voltage varies as a linear function of the pressing force and the power of the pressing force can correctly be detected by measuring the voltage value of the pressure detection voltage by the pressure detection circuit 18.

Accordingly, when the touch panel 10 is mounted on the back surface of the cover glass 49, the position (touch position) where a finger of the operator touches or approaches the front surface of the cover glass 49 can be detected. At the same time, the power of the pressing force by which the front surface of the cover glass 49 is pressed can be detected.

With use of the film 13 made of PLLA, pressing force can correctly be detected without being affected by pyroelectricity, i.e., by temperature. Since PLLA is a polymer and has flexibility, it is not damaged by large distortions as is the case in piezoelectric ceramics, and can detect pressing force with certainty even if a large distortion is caused by the pressing force.

In this touch panel 10, the pressure sensor electrodes 41 and the touch panel electrodes 32 are formed on the film 12. As a result, the film 12 is shared by the capacitive touch panel unit 15 and the pressure sensor unit 16. This advantageously eliminates one film from the total number of films in the touch panel 10 and both reduces the thickness of the touch panel 10 and enhances its translucency.

In addition, in this touch panel 10, the electrode non-formation portions 43 are formed at regions opposing the second touch panel electrodes 32 and the second pressure sensor electrodes 42 of the pressure sensor unit 16 are formed between the electrode non-formation portions 43. This configuration can prevent a drive signal of the capacitive touch panel unit 15 from leaking to the pressure sensor unit 16 as noise.

Figure 3A:
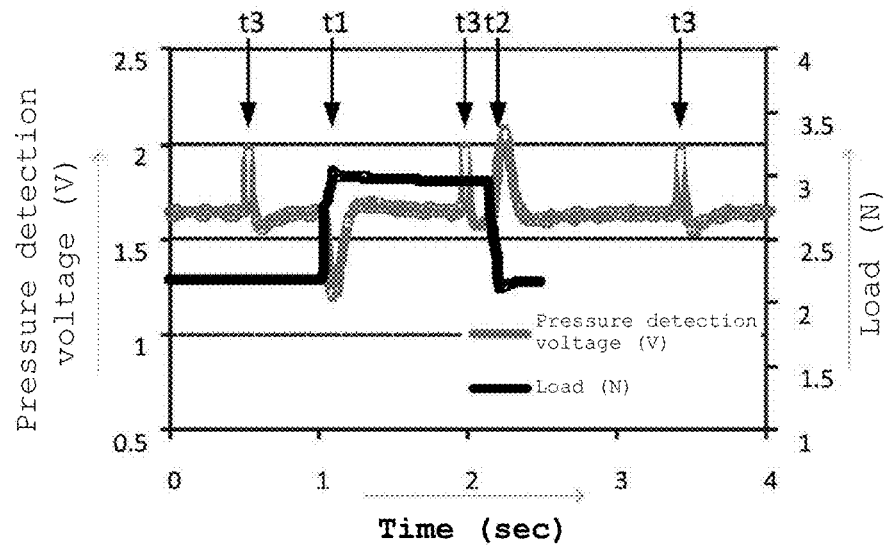
FIGS. 3(A) and 3(B) are waveform charts relating to pressure detection voltage of the touch panel according to the first embodiment of the present invention.
Figure 3B:
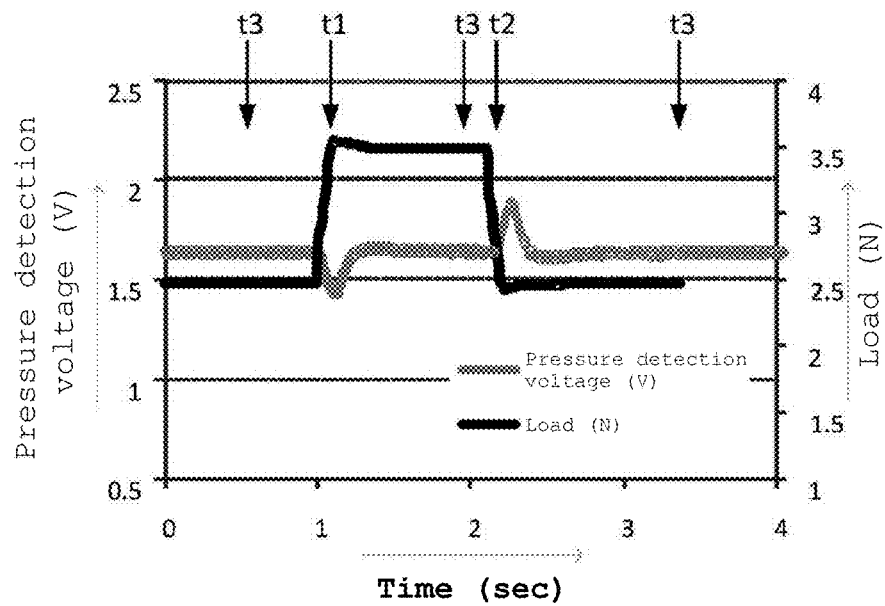
Figure 16A:
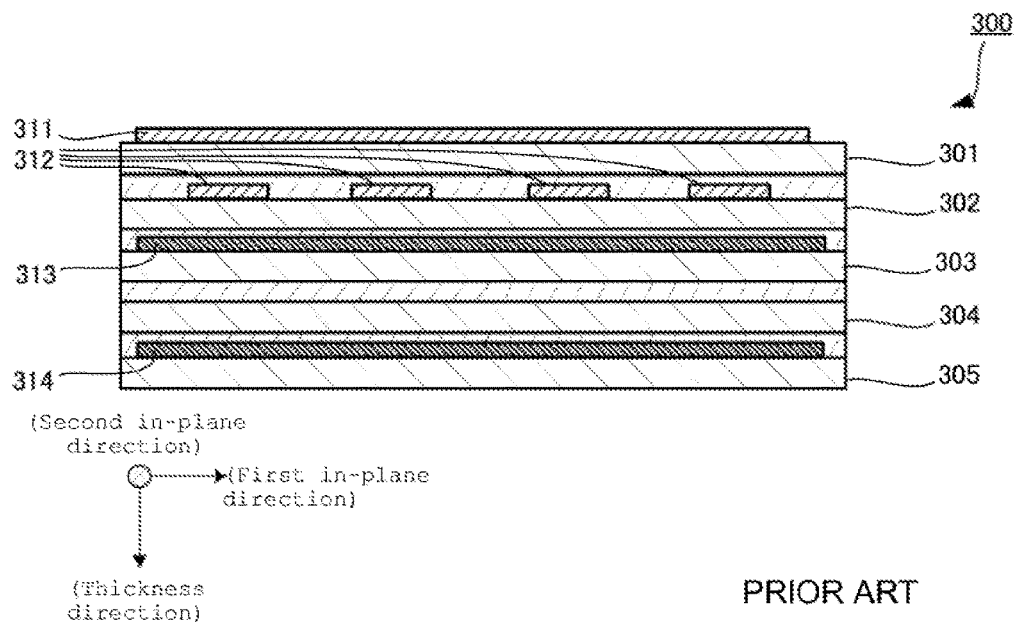
FIGS. 16(A) and 16(B) are side sectional views illustrating a touch panel according to a conventional example.
Figure 16B:
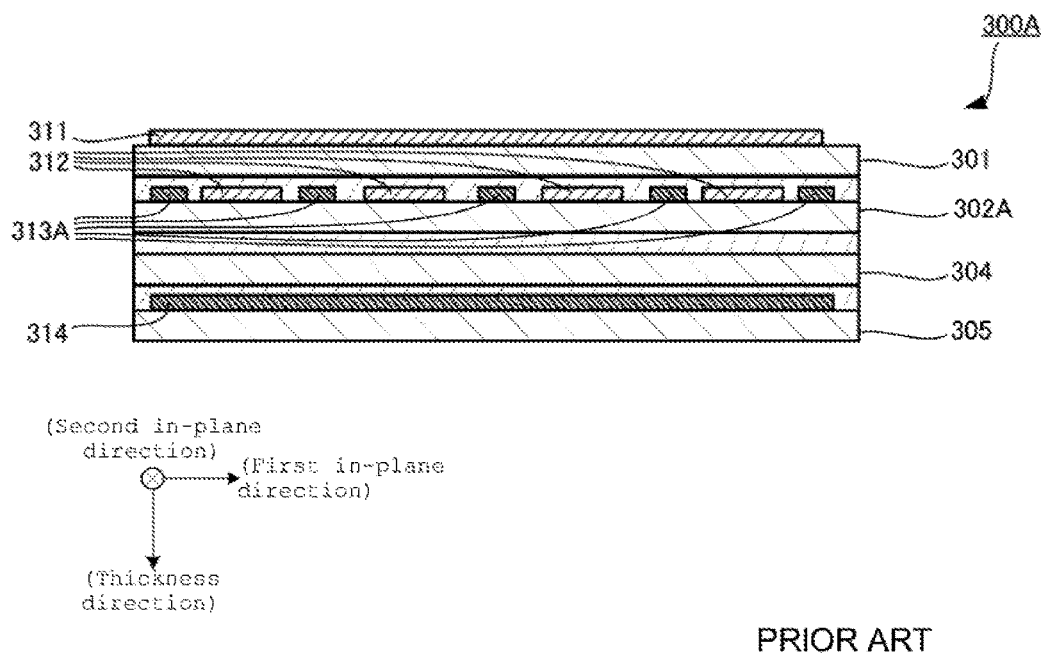

The influence of the drive signal from the capacitive touch panel unit 15 to the pressure detection voltage of the pressure sensor unit 16 will be described below in comparison between a conventional example (FIG. 16(B)) and the present embodiment. FIG. 3(A) is a waveform chart illustrating a time waveform of a load applied to a touch panel and a time waveform of pressure detection voltage according to the conventional example. FIG. 3(B) is a waveform chart illustrating a time waveform of a load applied to the touch panel and a time waveform of pressure detection voltage according to the present embodiment.

In the configuration according to the conventional example, a drive signal of the capacitive touch panel unit leaks to the pressure sensor unit as noise to cause unnecessary variation in the pressure detection voltage. This becomes a factor by which the detection precision of pressing force is deteriorated. For example, in FIG. 3(A), variation occurs in the pressure detection voltage at a timing t3 at which the drive pulse signal is periodically applied at the capacitive touch panel unit 15 as well as a timing t1 at which a load is applied to the touch panel and a timing t2 at which the load is removed.

In contrast, because the electrode non-formation portions 43 are formed at regions which oppose the second touch panel electrodes 32 and the second pressure sensor electrodes 42 are formed between the electrode non-formation portions 43, the invention prevents the drive signal of the capacitive touch panel unit 15 from leaking to the pressure sensor unit 16 as noise. For example, as shown in FIG. 3(B), the timing at which the pressure detection voltage varies is only the timing t1 at which a load is applied to the touch panel and the timing t2 at which the load is removed. The pressure detection voltage does not vary at the timing t3 at which the drive pulse signal is periodically applied at the capacitive touch panel unit 15.

As described above, the configuration according to the present embodiment can prevent a drive signal of the capacitive touch panel unit 15 from leaking to the pressure sensor unit 16 as noise, thereby being capable of enhancing detection precision of pressing force.

Notably, it is desirable that the above second pressure sensor electrodes 42 do not overlap with the second touch panel electrodes 32 in a plan view except for a wiring portion connecting the pressure sensor electrodes 42 to the pressure detection circuit 18. However, the second pressure sensor electrodes 42 and the second touch panel electrodes 32 may partially be overlapped with each other with a width less than or equal to 10% of the electrode width of each of the second pressure sensor electrodes 42 as a reference. Even with this configuration, the leakage of the noise of the drive signal from the capacitive touch panel unit 15 to the pressure sensor unit 16 can sufficiently be prevented.

As illustrated in FIGS. 3(A) and 3(B), pressure detection voltage is generally generated at the moment that the pressing force varies, and its voltage value rapidly decreases with the leakage of charges due to the piezoelectric effect. For this reason it is desirable that the pressure detection circuit 18 have a circuit structure exhibiting a large input impedance, or is composed of an integration circuit. With this configuration, the voltage value of the pressure detection voltage can be maintained for a certain period of time, whereby the measurement of the detection voltage value and the detection of pressing force can more surely be performed. The similar effect can also be obtained with integration of a signal through software.

The present embodiment shows the configuration in which the pressure sensor electrodes 41 are connected to the ground potential through the first connection terminal P-GND of the pressure detection circuit 18. However, the pressure sensor electrodes 42 may be connected to the ground potential through the first connection terminal P-GND. However, the pressure sensor electrodes 41 disposed at the capacitive touch panel unit 15 are desirably connected to the pressure detection circuit 18 through a connection terminal having low impedance, such as the first connection terminal P-GND connected to the ground potential. This configuration can prevent the deterioration in detection precision of a touch position with the capacitive touch panel unit 15 due to the leakage of noise from the pressure detection circuit 18 to the capacitive touch panel unit 15 (especially the reception electrodes).

The present embodiment also describes the configuration in which the film 12 is arranged over the piezoelectric film 13, and the film 14 is arranged under the piezoelectric film 13 in the pressure sensor unit 16. However, the configuration of the piezoelectric film is not limited thereto. For example, the pressure sensor electrodes 41 and 42 or the touch sensor electrodes 32 may directly be adhered or bonded to the piezoelectric film 13. With this configuration, the films 12 and 14 and the adhesive sheets 23 and 24 for bonding these films to the piezoelectric film 13 can be eliminated.

FIG. 14 is a side sectional view illustrating a touch panel 10' according to a modification of the first embodiment of the present invention. In this touch panel 10', the films 12 and 14 and the adhesive sheets 23 and 24 which are provided in the first embodiment are eliminated. Instead, the pressure sensor electrodes 41 and 42 and the touch sensor electrodes 32 are directly bonded to the piezoelectric film 13.

With the configuration in which the films 12 and 14 and the adhesive sheets 23 and 24 are eliminated, the thickness of the touch panel 10' can further be reduced and the optical transparency of the touch panel 10' can be enhanced. In addition, the space between the pressure sensor electrodes 41 and the pressure sensor electrodes 42 is decreased, whereby charges generated on the piezoelectric film 13 can efficiently be detected by the pressure sensor electrodes 41 and 42 to enhance pressure detection sensitivity. In this modification, a set of the film 12 and the adhesive sheet 23 as well as a set of the film 14 and the adhesive sheet 24 are eliminated. However, only one set may be eliminated.

Next, a touch panel 50 according to a second embodiment of the present invention will be described.

Figure 4A:
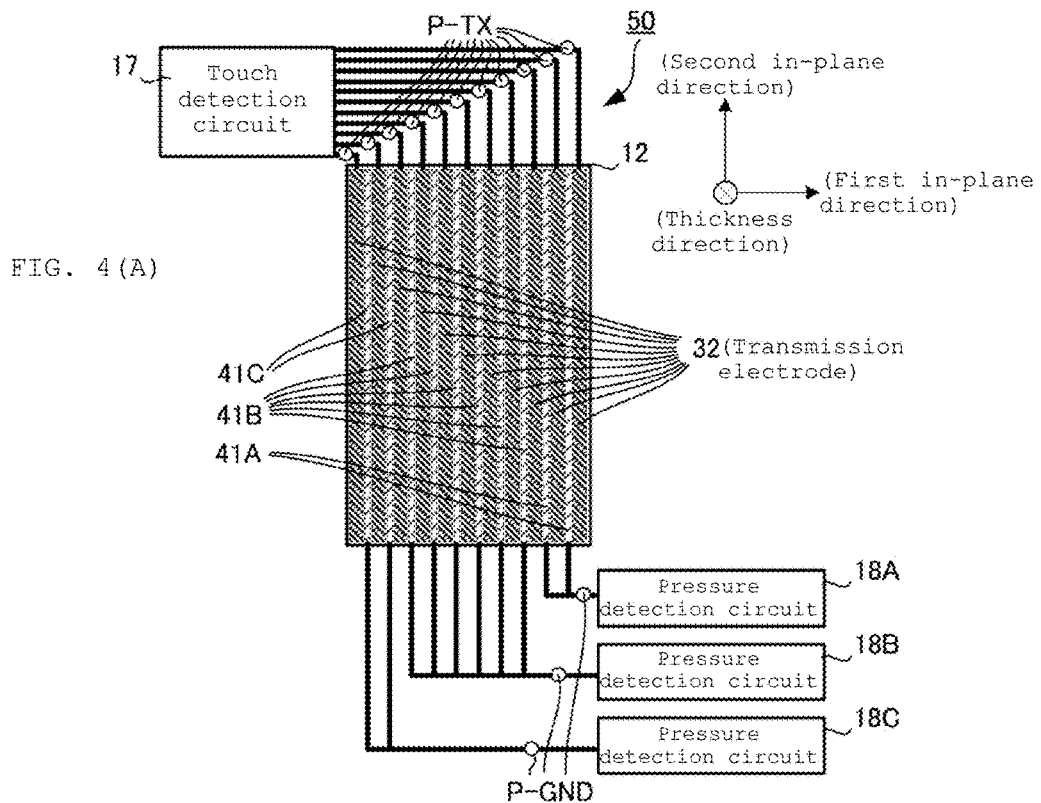
FIGS. 4(A) and 4(B) are plan views illustrating films of a touch panel according to a second embodiment of the present invention.
Figure 4B:
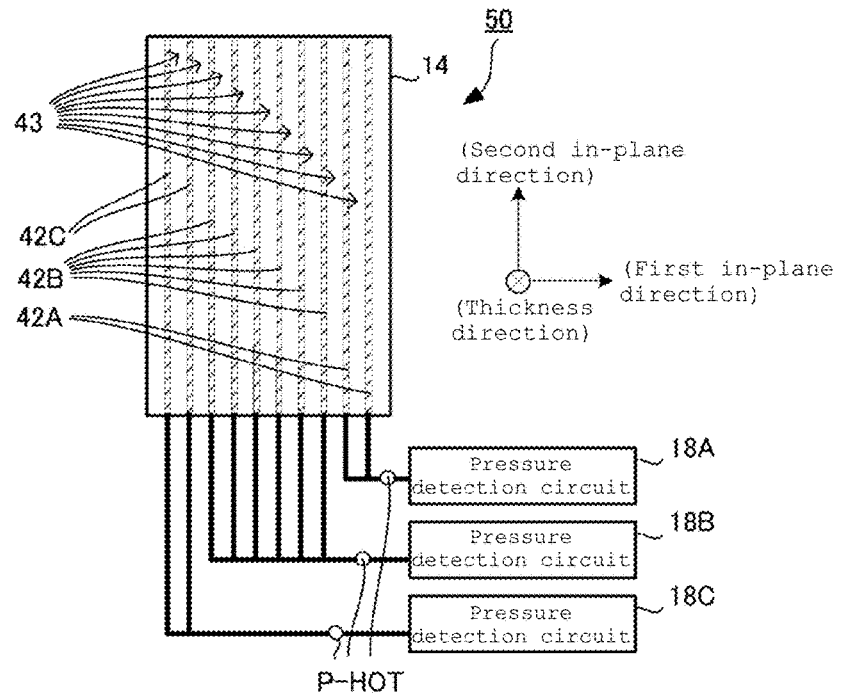

FIGS. 4(A) and 4(B) are plan views illustrating films 12 and 14 of the touch panel 50 according to the second embodiment of the present invention.

The touch panel 50 has a similar configuration to the first embodiment. Unlike the first embodiment, the touch panel 50 includes a plurality of pressure detection circuits 18A, 18B, and 18C. Each of the pressure detection circuits 18A, 18B, and 18C includes a first connection end P-GND and a second connection end P-HOT.

Among the pressure sensor electrodes 41 mounted on the top surface of the film 12 illustrated in FIG. 4(A), two pressure sensor electrodes 41A located close to the right elongated side of the film 12 (as viewed in FIG. 4(A)) are connected to the first connection end P-GND of the pressure detection circuit 18A. Two pressure sensor electrodes 41C located close to the left long side of the film 12 (as viewed in FIG. 4(A)) are connected to the first connection end P-GND of the pressure detection circuit 18C. The remaining six pressure sensor electrodes 41B located around the center in the lateral direction of the film 12 are connected to the first connection end P-GND of the pressure detection circuit 18B.

Among the pressure sensor electrodes 42 mounted on the top surface of the film 14 illustrated in FIG. 4(B), two pressure sensor electrodes 42A located close to the right elongated side of the film 12 (as viewed in FIG. 4(B)) are connected to the second connection end P-HOT of the pressure detection circuit 18A. Two pressure sensor electrodes 42C located close to the left long side of the film 12 (as viewed in FIG. 4(B)) are connected to the second connection end P-HOT of the pressure detection circuit 18C. The remaining six pressure sensor electrodes 42B located around the center in the lateral direction of the film 14 are connected to the second connection end P-HOT of the pressure detection circuit 18B.

Figure 6:
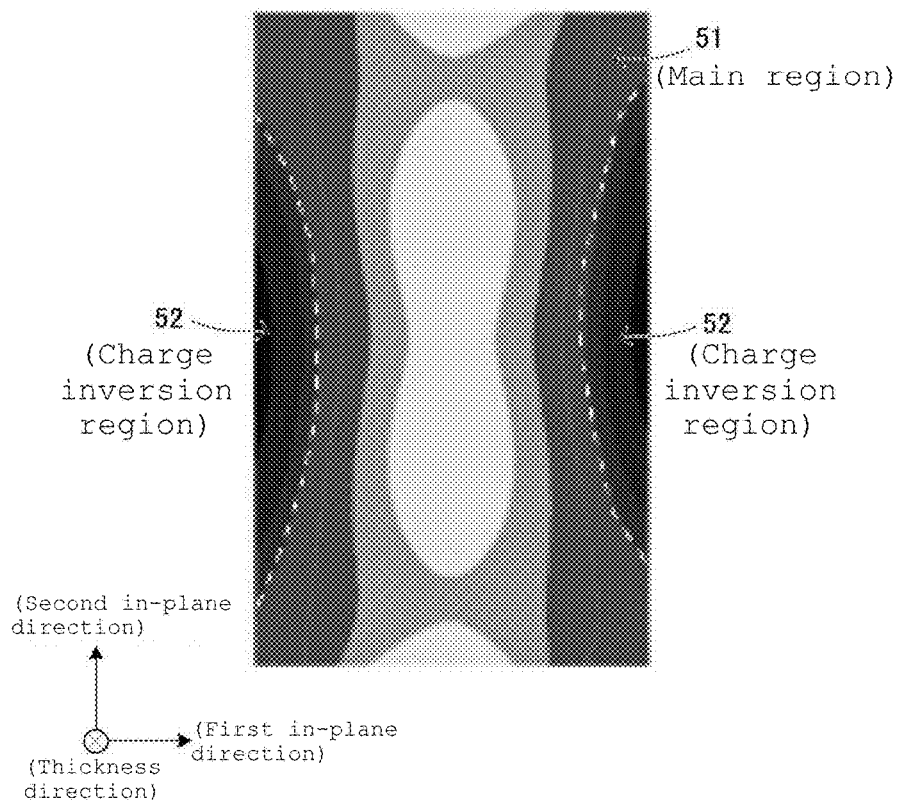
FIG. 6 is a view illustrating distribution of charges generated on a second film.

With this configuration, and as illustrated in FIG. 6, the polarity of charges generated in a charge inversion region 52 located close to the elongated sides of the piezoelectric film 13 is sometimes inverted from the polarity of charges generated in a main region 51 of the piezoelectric film 13. If only a single pressure detection circuit is provided, and the pressure detection voltages of the pressure sensor electrodes 41A and 42A or the pressure sensor electrodes 41C and 42C, which overlap with the region 52 located close to the elongated sides of the piezoelectric film 13, are directly added to the pressure detection voltages of the pressure sensor electrodes 41B and 42B overlapped with only the main region 51 of the piezoelectric film 13, both detection voltages are offset, so that the synthesized voltage value of the pressure detection voltages may be reduced.

To overcome this problem, a plurality of pressure detection circuits 18A, 18B, and 18C are provided, and each of the pairs of the pressure sensor electrodes which are located adjacent to one another in the lateral direction, is connected to a different one of the pressure detection circuits 18A, 18B, and 18C. This configuration can prevent the pressure detection voltages from being offset, whereby the voltage values of the pressure detection voltages can be increased to enhance pressure detection sensitivity. More preferably, the pressure detection voltages of the pressure detection circuits 18A and 18C may be converted into inverse voltages, and added to the pressure detection voltage of the pressure detection circuit 18B. This configuration can further increase the voltage values of the pressure detection voltages in the touch panel 50, thereby being capable of further enhancing pressure detection sensitivity. The total number of the pressure detection circuits, the number and combination of the pressure sensor electrodes connected to each pressure detection circuit, and the shape of each of the pressure sensor electrodes may be different than those described above.

Figure 15A:
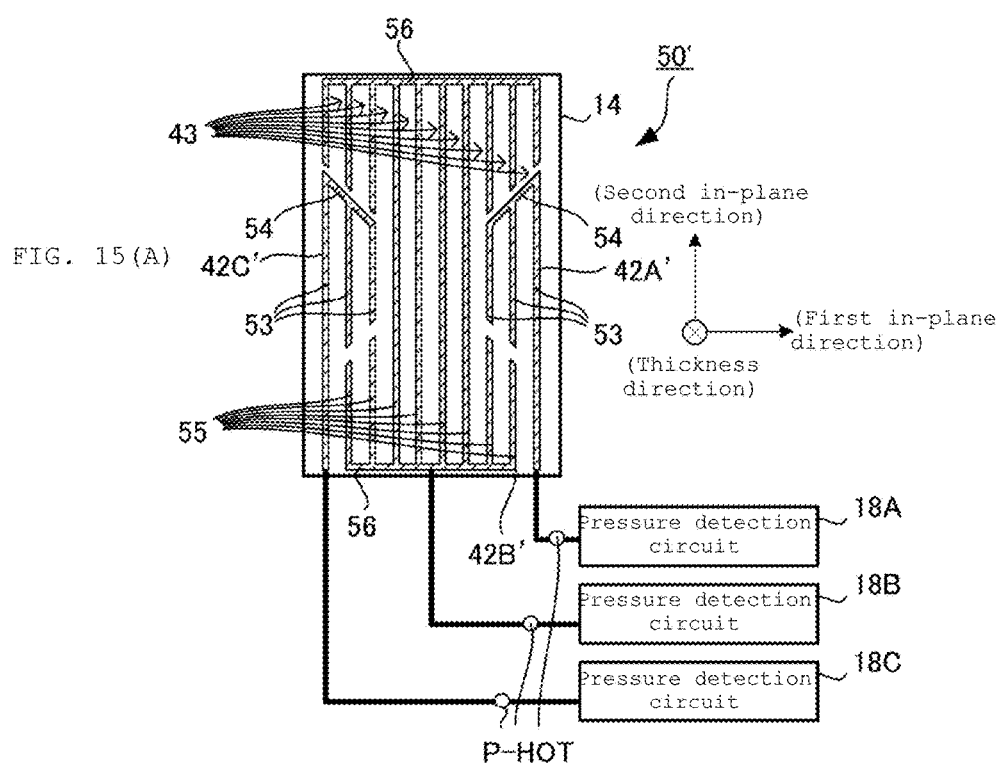
FIGS. 15(A) and 15(B) are side sectional views illustrating a touch panel according to a modification of the second embodiment.

FIG. 15(A) is a plan view illustrating a film 14 of a touch panel 50' according to a modification of the second embodiment of the present invention. Second pressure sensor electrodes 42A', 42B', and 42C' are provided on the top surface of the film 14. The second pressure sensor electrodes 42A', 42B', and 42C' have shapes different from the second embodiment.

More specifically, the second pressure sensor electrode 42A' and the second pressure sensor electrode 42C' have a plurality of railway-like portions 53 extending opposite to the first pressure sensor electrodes 41 (not shown) and a connection portion 54 that connects one end of each of the railway-like portions 53 at the position overlapped with the charge inversion region 52 (not shown) illustrated in FIG. 6. The second pressure sensor electrode 42B' has a plurality of railway-like portions 55 extending opposite to the first pressure sensor electrodes 41 (not shown) and connection portions 56 connecting opposite ends of the railway-like portions 55 at a position which overlaps the main region 51 (not shown) illustrated in FIG. 6.

The second pressure sensor electrode 42A', the second pressure sensor electrode 42C', and the second pressure sensor electrode 42B' are each connected to different pressure detection circuits 18A, 18B, and 18C, the second pressure sensor electrode 42A' and the second pressure sensor electrode 42C' being provided to overlap the charge inversion region 52 (not shown), the second pressure sensor electrode 42B' being provided to overlap the main region 51. This configuration can also prevent the pressure detection voltages generated on the film 14' from being offset. Since the second pressure sensor electrodes 42A', 42B', and 42C' have the appropriate shapes according to the shapes of the charge inversion region 52 and the main region 51, the touch panel 50' can further enhance pressure detection sensitivity than the configuration described in the second embodiment.

Figure 15B:
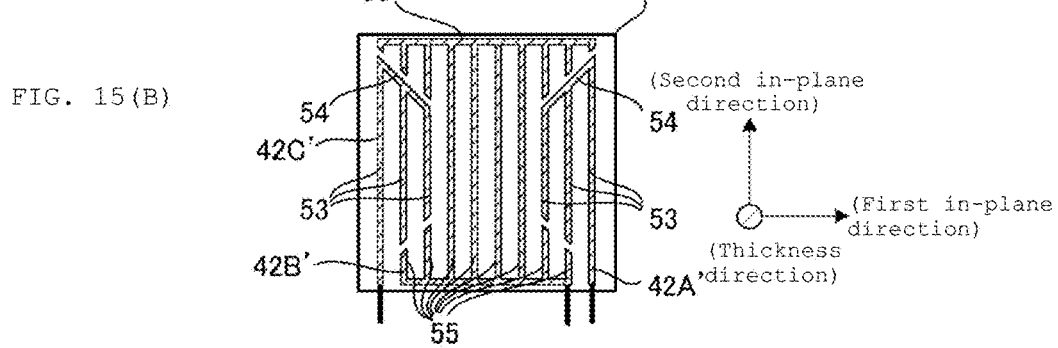

The appropriate shape of each of the second pressure sensor electrodes 42A', 42B', and 42C' is determined based on the shape of the film 14' and a holding structure of the film 14'. For example, FIG. 15(B) is a plan view of a film 14' with a square outer shape. If the outer shape of the film 14' is nearly square, the polarity of charges generated on the film in response to a pressing operation is inverted for each region divided along a diagonal line. Therefore, when the outer shape of the film is nearly square, charges generated on each region are mostly offset. This is true even if the second pressure sensor electrodes are provided with the shape illustrated in the second embodiment (see FIGS. 4(A) and 4(B)). Thus, pressing can hardly be detected. On the other hand, if the second pressure sensor electrodes are provided with the shapes illustrated in FIG. 15(B) on the film having an outer shape of nearly square, charges generated on each region are difficult to be offset, whereby pressing can correctly be detected.

Next, a touch panel 60 according to a third embodiment of the present invention will be described.

Figure 5:
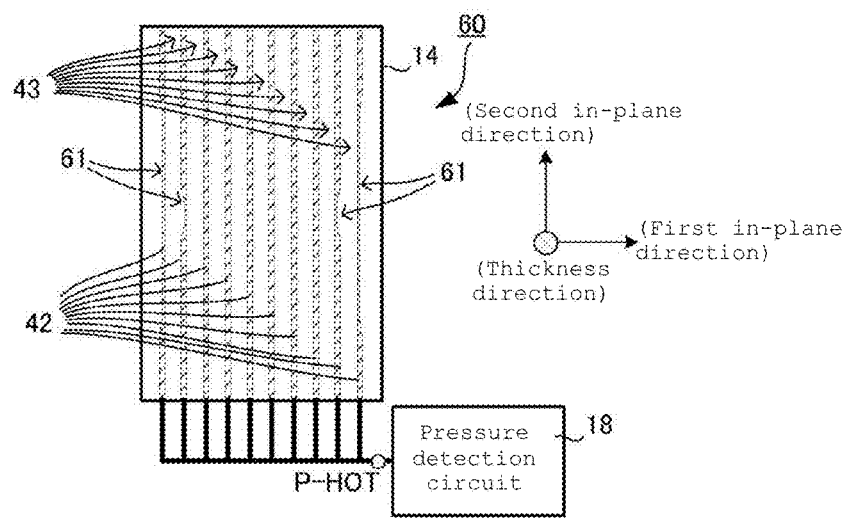
FIG. 5 is a plan view illustrating a film of a touch panel according to a third embodiment of the present invention.

FIG. 5 is a plan view illustrating a film 14 of the touch panel 60 according to the third embodiment of the present invention.

The touch panel 60 has a similar configuration to the first embodiment except for a part of the pressure sensor electrodes 42 provided on the film 14. Specifically, the pressure sensor electrodes 42 located near the long sides of the touch panel 60 have narrowed parts 61.

As discussed above, the polarity of charges generated in the region 52 located close to the elongated sides of the piezoelectric film 13 is sometimes inverted from the polarity of charges generated on the main region 51 of the film 13 as illustrated in FIG. 6. To overcome this problem, the narrowed parts 61 are formed on the pressure sensor electrode 42 at a location near the elongated side of the film 14. This configuration can prevent the charges with the inverted polarity from being detected, thereby preventing the pressure detection voltages from being offset. The narrowed parts 61 may be formed on both of the pressure sensor electrodes 41 and 42, or may be formed on only the pressure sensor electrode 41. It is believed that the portion serving as the charge inversion region is changed according to the shape or fixing method of the film 13. Therefore, the narrowed parts 61 may be formed according to the location of the charge inversion region.

Figure 7:
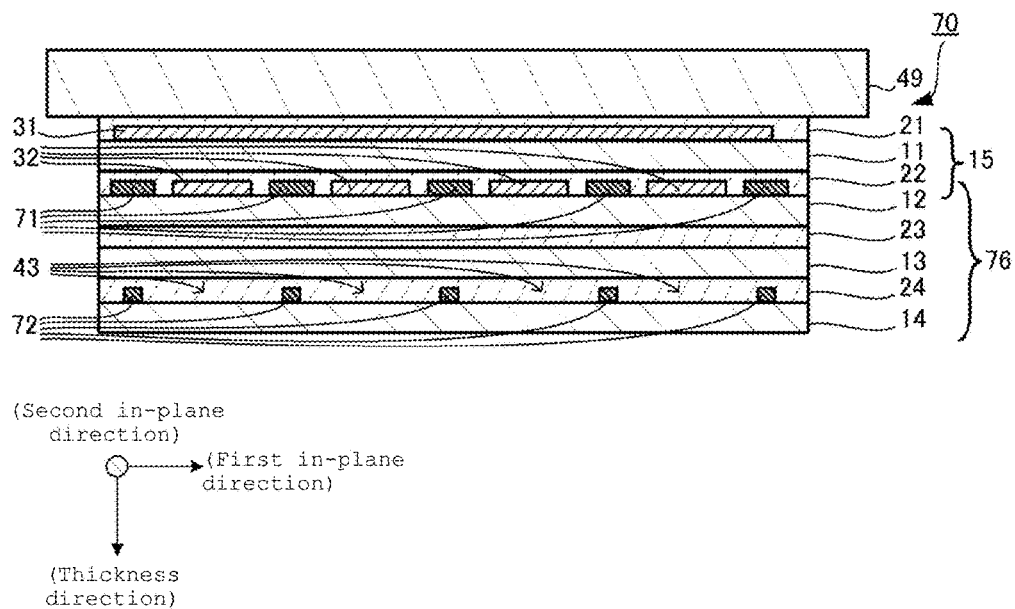
FIG. 7 is a side sectional view illustrating a touch panel according to a fourth embodiment of the present invention.

Next, a touch panel 70 according to a fourth embodiment of the present invention will be described with reference to FIG. 7.

The touch panel 70 has a similar configuration to that of the first embodiment except for a part of electrodes formed on the film 12 and a part of electrodes formed on the film 14. More particularly, the touch panel 70 includes pressure sensor electrodes 71 and 72 having the configurations which differ from the first embodiment. The pressure sensor electrodes 71 has a uniform electrode width larger than that of the pressure sensor electrodes 72. Each of the pressure sensor electrodes 72 has a uniform electrode width smaller than the pressure sensor electrode 71, and is overlapped with the pressure sensor electrode 71 in the vicinity of the center of the electrode width of the pressure sensor electrode 71.

In the touch panel 70 having the above configuration, it is difficult to generate a capacitance change between the pressure sensor electrode 71 and the pressure sensor electrode 72, even if the formation positions of the pressure sensor electrode 71 and the pressure sensor electrode 72 are shifted in the direction of the electrode width, or the films 12 and 14 are adhered with a shift (lamination shift) in the direction of the electrode width. Accordingly, the pressure characteristics of the touch panel 70 do not easily vary on a product by product basis. As a result, calibration of the pressure characteristics is not required.

Further, the capacitance between the touch panel electrodes 32 and the pressure sensor electrodes 72 can be made smaller than in the first embodiment. As a result, the influence of noises, such as touch panel drive noise, transmitted from the capacitive touch panel unit 15 to the pressure sensor unit 76 through the above capacitance can be reduced.

Next, a touch panel 80 according to a fifth embodiment of the present invention will be described.

Figure 8:
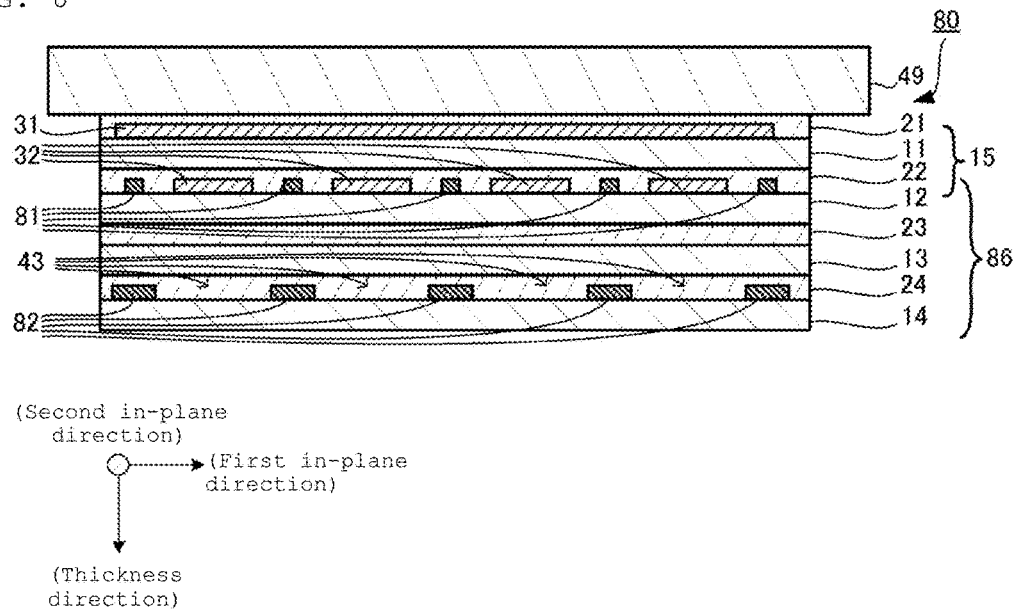
FIG. 8 is a plan view illustrating films of a touch panel according to a fifth embodiment of the present invention.

FIG. 8 is a side sectional view illustrating the touch panel 80 according to the fifth embodiment of the present invention.

The touch panel 80 has an approximately similar configuration to the first embodiment except for a part of electrodes formed on the film 12 and a part of electrodes formed on the film 14. Specifically, the touch panel 80 includes pressure sensor electrodes 81 and 82 having configurations different from the first embodiment. The pressure sensor electrode 82 has a uniform electrode width which is larger than the width of the pressure sensor electrode 81. The pressure sensor electrode 81 has a uniform electrode width which is smaller than the width of the pressure sensor electrode 82, and overlaps the pressure sensor electrode 82 in the vicinity of the center of the electrode width of the pressure sensor electrode 82.

With this configuration, it is possible to suppress capacitance change between the pressure sensor electrode 81 and the pressure sensor electrode 82, even if the formation positions of the pressure sensor electrode 81 and the pressure sensor electrode 82 are shifted in the direction of the electrode width, or the film 12 and the film 14 are adhered with a shift (lamination shift) in the direction of the electrode width during assembly. Accordingly, there is little variation in pressure characteristics on a product by product basis and calibration of the pressure characteristics is unnecessary.

In addition, in the touch panel 80, the space between the pressure sensor electrode 81 and the touch panel electrode 32 formed on the same plane of the film 12 is increased, whereby floating capacitance generated between both electrodes becomes smaller than the embodiments previously described. With this, the influence of noise, such as touch operation noise, transmitted from the capacitive touch panel unit 15 to a pressure sensor unit 86 through the floating capacitance is reduced.

In the touch panel 80, the pressure sensor electrodes 81 formed on the same plane as the touch panel electrodes 32 can be connected to the second connection end P-HOT (see FIG. 2(C)) of the pressure detection circuit 18 for use. The pressure sensor electrodes 82 arranged opposite to the pressure sensor electrodes 81 are connected to the first connection end P-GND (see FIG. 2(B)) of the pressure detection circuit. As a result, the pressure sensor electrodes 82 shield noise emitted from the back surface of the touch panel 80. Therefore, even if a component such as a liquid crystal display device that easily generates electromagnetic noise is used at the back surface of the touch panel 80, the properties of the touch panel 80, such as pressure detection precision, are not easily deteriorated and are stably enhanced.

Next, a touch panel 90 according to a sixth embodiment of the present invention will be described.

Figure 9:
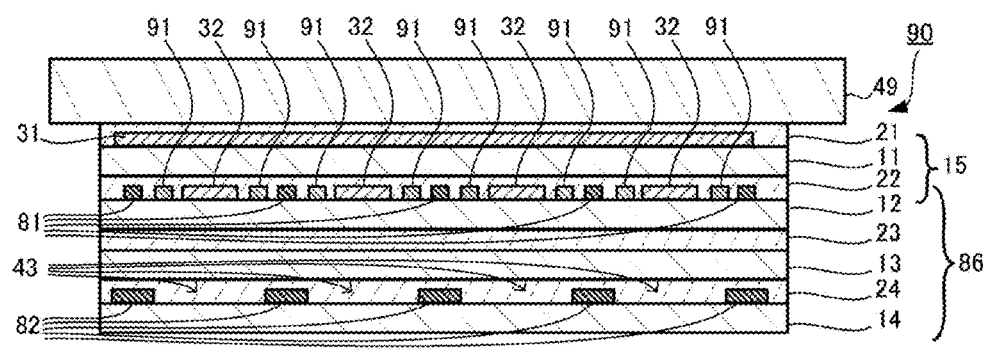
FIG. 9 is a plan view illustrating films of a touch panel according to a sixth embodiment of the present invention.

FIG. 9 is a side sectional view illustrating the touch panel 90 according to the sixth embodiment of the present invention.

The touch panel 90 has a similar configuration to the fifth embodiment except for a part of electrodes provided on the film 12. Specifically, the touch panel 90 includes ground electrodes 91, each of which is located between a respective pressure sensor electrode 81 and a respective touch panel electrode 32.

The touch panel 90 with the above configuration includes ground electrodes 91. Therefore, little, if any, floating capacitance is generated between the pressure sensor electrodes 81 and the touch panel electrodes 32. As a result, the influence of noises, such as touch operation noise, transmitted from the capacitive touch panel unit 15 to the pressure sensor unit 86 through the floating capacitance is further reduced.

Next, a touch panel 100 according to a seventh embodiment of the present invention will be described.

Figure 10:
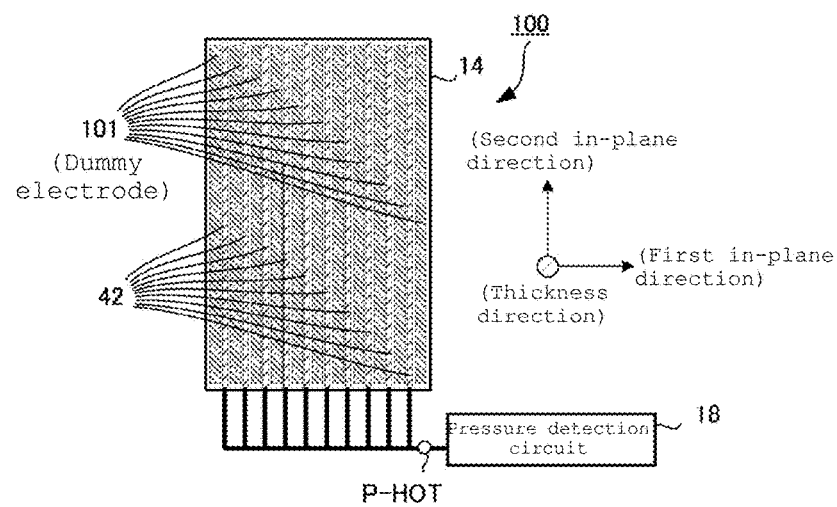
FIG. 10 is a plan view illustrating a film of a touch panel according to a seventh embodiment of the present invention.

FIG. 10 is a plan view illustrating a film 14 of the touch panel 100 according to the seventh embodiment of the present invention.

The touch panel 100 has a similar configuration to the first embodiment except for some of the electrodes provided on the film 14. Specifically, dummy electrodes 101 electrically isolated from other electrodes are provided between the pressure sensor electrodes 42 formed on the film 14. Each of the dummy electrodes 101 has the same shape and arrangement as those of the touch panel electrode 32 (see FIG. 2) formed on the film 12.

In the touch panel 100 with the above configuration having the dummy electrodes 101, the number of layers in which electrodes are overlapped in the laminating direction can be made equal between each unit. This configuration can reduce variation (color unevenness) in translucency which can be visually recognized, when the entire touch panel 100 is viewed from the front surface. This configuration also enables flattening of the front surface of the entire touch panel 100.

Figure 11:
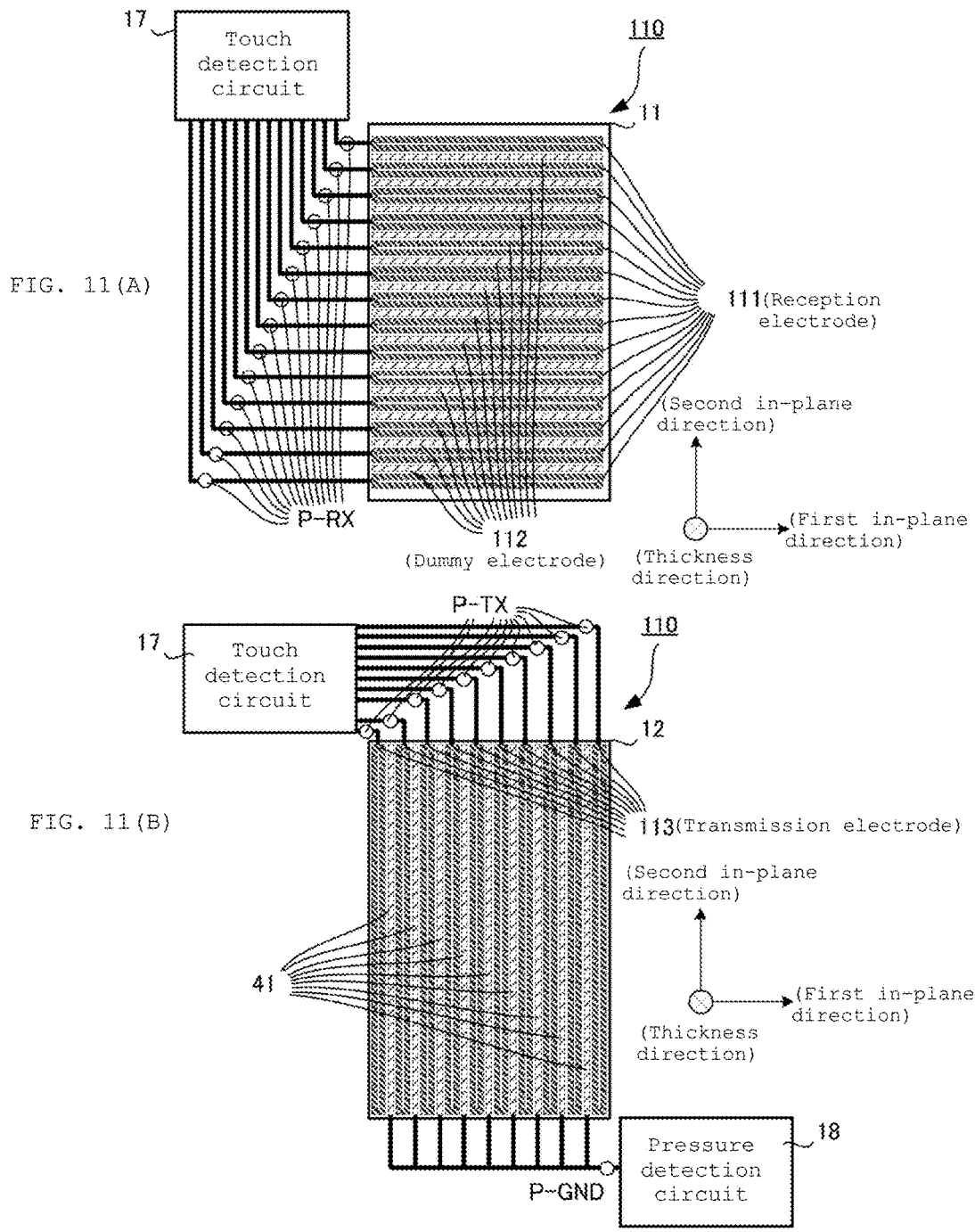
FIGS. 11(A) and 11(B) are plan views illustrating films of a touch panel according to an eighth embodiment of the present invention.

Next, a touch panel 110 according to an eighth embodiment of the present invention will be described. FIGS. 11(A) and 11(B) are plan views illustrating a film 12 of the touch panel 110 according to the eighth embodiment of the present invention.

The touch panel 110 has a similar configuration to the first embodiment except for a part of electrodes formed on the film 11 and a part of electrodes formed on the film 12. Specifically, a plurality of touch panel electrodes 111 formed on the film 11 are configured to include a plurality of linear electrode portions extending in the first in-plane direction (i.e., horizontally as viewed in FIG. 11(A)). These electrodes are preferably annular in shape. A plurality of dummy electrodes 112, also linearly extending in the first in-plane direction, are provided between the touch panel electrodes 111 on the film 11. As shown in FIG. 11(B), a plurality of touch panel electrodes 113 are formed on the film 12 and are configured to include a plurality of linear electrode portions extending in the second in-plane direction. These electrodes are preferably annular in shape.

The electrode portions of the touch panel electrodes 111 and the dummy electrodes 112 linearly extending in the first in-plane direction have equal electrode widths and are equally spaced from one another. Similarly, the electrode portions of the touch panel electrodes 113 linearly extending in the second in-plane direction and the pressure sensor electrodes 41 have equal electrode widths and are equally spaced from one another.

In the touch panel 110 having the above configuration, the electrodes are formed with uniform electrode width and are equally spaced on almost the entire surfaces of the films 12 and 13. Therefore, the electrodes formed on the films 12 and 13 are not easily seen when the entire touch panel 100 is viewed from the front surface. This configuration can also prevent a visual phenomenon such as moire from being visually recognized.

When dummy electrodes are formed on the film 14, it is preferable that each electrode formed on the film 14 has an equal electrode width and equal arrangement space. This configuration can make it difficult to visually recognize the electrodes formed on the film 14 as well.

Next, a touch panel 120 according to a ninth embodiment of the present invention will be described.

Figure 12:
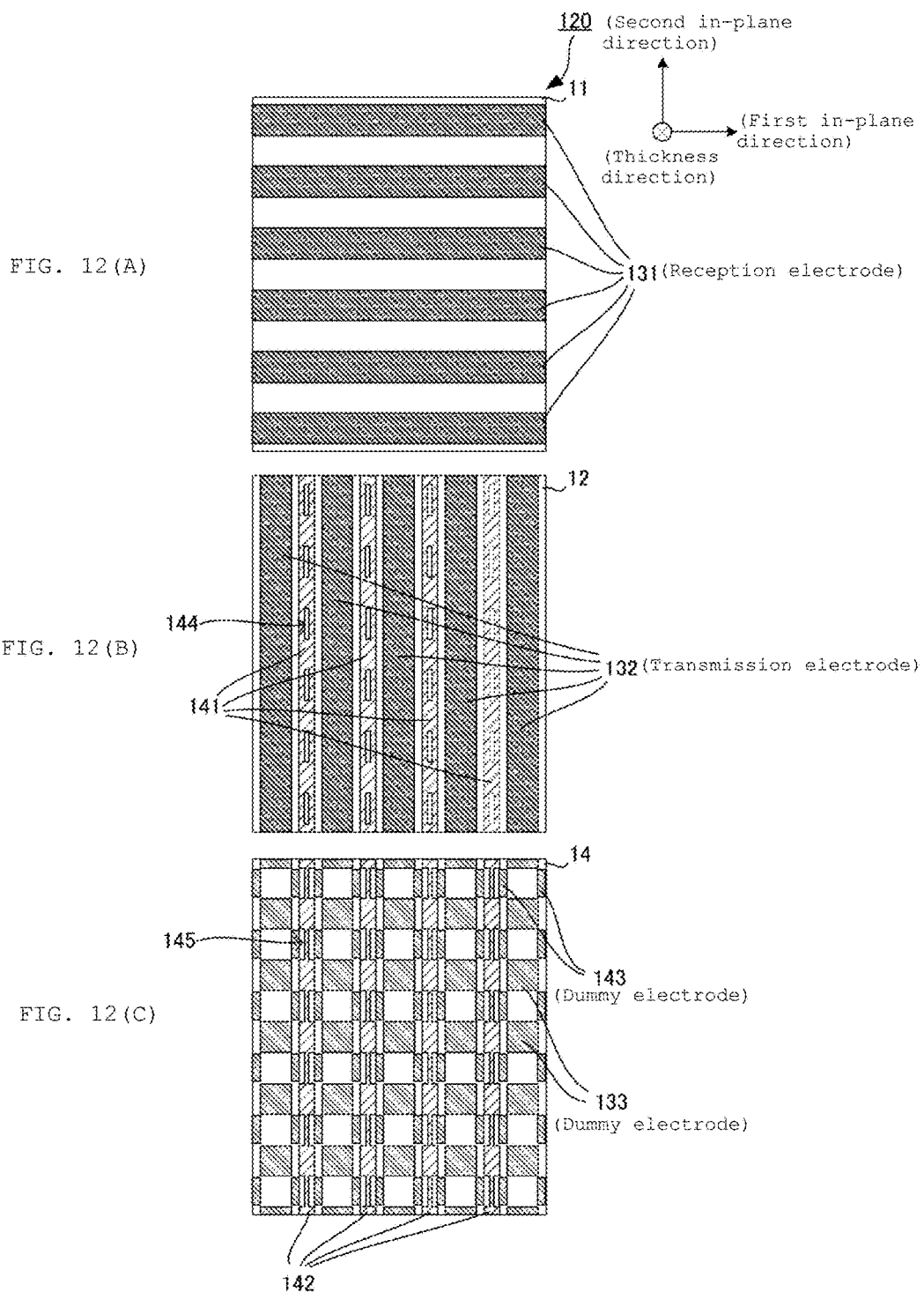
FIGS. 12(A)-12(C) are plan views illustrating films of a touch panel according to a ninth embodiment of the present invention.

FIG. 12(A) is a plan view illustrating a film 11 of the touch panel 120 according to the ninth embodiment of the present invention. FIG. 12(B) is a plan view illustrating a film 12 of the touch panel 120. FIG. 12(C) is a plan view illustrating a film 14 of the touch panel 120.

The touch panel 120 includes first touch panel electrodes 131, second touch panel electrodes 132, dummy electrodes 133, first pressure sensor electrodes 141, second pressure sensor electrodes 142, and dummy electrodes 143. The first touch panel electrodes 131 are provided on the film 11. The second touch panel electrodes 132 and the first pressure sensor electrodes 141 are provided on the film 12. The dummy electrodes 133, the second pressure sensor electrodes 142, and the dummy electrodes 143 are formed on the film 14. Notably, the dummy electrodes 133, the second pressure sensor electrodes 142, and the dummy electrodes 143 are not electrically connected to one another.

The first touch panel electrodes 131 and the second touch panel electrodes 132 are elongated, and overlapped with each other in a two-dimensional lattice. The dummy electrodes 133 are formed on regions which do not overlap with the first touch panel electrodes 131 but overlapped with the second touch panel electrodes 132 in a plan view.

As a result, one of the first touch panel electrode 131 or the dummy electrode 133 is overlapped with the region where the second touch panel electrode 132 is formed in a plan view. Specifically, two electrodes always overlap with each other throughout the region where the second touch panel electrode 132 is formed in a plan view.

The first pressure sensor electrodes 141, the second pressure sensor electrodes 142, and the dummy electrodes 143 are formed on the regions where the second touch panel electrodes 132 are not formed in a plan view.

The first pressure sensor electrodes 141 have a fixed width and extend in parallel with the second touch panel electrodes 132 with a fixed space between the second touch panel electrodes 132. A slit 144 having a length same as the width of the first touch panel electrode 131 is formed in the region of the first pressure sensor electrode 141 overlapped with the first touch panel electrode 131.

The second pressure sensor electrodes 142 oppose the first pressure sensor electrodes 141 and extend parallel to one another. The region of the second pressure sensor electrode 142 which does not overlap with the first touch panel electrode 131 has the width same as the width of the first pressure sensor electrode 141. On the other hand, the region of the second pressure sensor electrode 142 which overlaps with the first touch panel electrode 131 is formed with a narrow-width part 145 having the width same as the width of the slit 144.

The slit 144, the narrow-width part 145, and the dummy electrode 143 are provided in the region where the second touch panel electrode 132 is not formed and the first touch panel electrode 131 is formed in a plan view. In this region, the dummy electrode 143 and the narrow-width part 145 do not overlap either side of the slit 144 on the first pressure sensor electrode 141, and they are respectively provided at complementary positions. Thus, the entire of this region is covered by some electrode. Accordingly, two electrodes always overlap throughout the entirety of this region.

The portion of the first pressure sensor electrode 141 where the slit 144 is not formed and the portion of the second pressure sensor electrode 142 where the narrow-width part 145 is not formed overlap with each other in the region where the first and second touch panel electrodes 131 and 132 are not formed in plan view.

Therefore, two electrodes which are the first pressure sensor electrode 141 and the second pressure sensor electrode 142 are overlapped with each other on the central part of this region, and neither of the electrodes is overlapped on either side of these electrodes.

In the touch panel 120 thus configured according to the present embodiment, the respective electrodes are overlapped in two layers at most in a plan view. Since electrodes having high translucency overlap, the touch panel 120 does not cause a phenomenon in which translucency of the touch panel 120 as a whole is reduced. Thus, high translucency can be obtained.

In the present embodiment, the dummy electrodes 142 and 143 are formed to prevent the generation of variation in the number of the electrodes which overlap each other. However, the dummy electrodes 142 and 143 are not always necessary, and either one of the dummy electrodes 142 and 143 may be formed.

In the preferred embodiment, the slit 144 is formed on the first pressure sensor electrode 141, and the narrow-width part 145 is formed on the second pressure sensor electrode 142. However, the narrow-width part 145 may be formed on the first pressure sensor electrode 141, and the slit 144 may be formed on the second pressure sensor electrode 142.

In the preferred embodiment, the length and width of the narrow-width part 145 are equal to those of the slit 144. However, the lengths and widths of the narrow-width part 145 and the slit 144 may be different from each other to a certain extent. For example, even if the ends of the respective electrodes are overlapped with a width 1/10 the width of the wide portion of the second pressure sensor electrode, or are spaced, visibility is less affected by these configurations.

Depending on an electrode material to be used, the width of the narrow-width part 145 is desirably set to a value by which resistance is not sharply increased, and it is preferably adjusted according to the specification of the pressure sensor unit 16.

Next, an electronic device 150 according to a tenth embodiment of the present invention will be described. FIG. 13 is a block diagram illustrating the electronic device 150.

The electronic device 150 includes the above touch panel 120, a control unit 151, and a display unit 152. The touch panel 120 includes the capacitive touch panel unit 15, the pressure sensor unit 16, the touch detection circuit 17, and the pressure detection circuit 18. The capacitive touch panel unit 15 detects a touch operation on an operation surface. The touch detection circuit 17 reads a change in capacitance from the capacitive touch panel unit 15. Thus, the touch detection circuit 17 generates an operation signal involved with whether the touch operation is performed on the operation surface and the position of the touch operation on the operation surface, and outputs the generated operation signal to the control unit 151. The pressure sensor unit 16 detects a pressing operation on the operation surface. The pressure detection circuit 18 reads a potential difference from the pressure sensor unit 16. Thus, the pressure detection circuit 18 generates an operation signal as a function of the strength of the pressing operation applied to the operation surface, and outputs the generated operation signal to the control unit 151. When receiving the operation signals from the touch detection circuit 17 and the pressure detection circuit 18, the control unit 151 performs a control of application corresponding to the operation signals. The control unit 151 also generates a display signal, as needed, based on the calculation result of the application, and outputs the display signal to the display unit 152. The display unit 152 is made of a liquid crystal panel or the like, and mounted to the touch panel 10 at the side opposite to the operation surface. The display unit 152 displays an image on the operation surface, serving as a display surface, of the touch panel 10 having translucency.

As described in the present embodiment, the touch panel according to the present invention can be applied to an electronic device having a display unit. Because of the construction of the touch panel according to the present invention, one can use a light source on the display unit which emits less light than would otherwise be required because of the high translucency of the touch panel owing to the fact that it uses fewer laminated films than the prior art. Accordingly, the touch panel can reduce power consumption on the display unit. This brings a significant merit such that a battery duration time is extended in a mobile electronic device having a problem of drain of battery due to a display, such as especially a smartphone or tablet terminal. Therefore, the electronic device according to the present invention more preferably includes a display unit laminated on a touch panel. The touch panel according to the present invention can be configured to reduce color unevenness visually recognized from the operation surface. Therefore, the touch panel is especially effective for an electronic device which is demanded to display an image with high reproducibility.

The touch panel and the electronic device according to the present invention can be embodied as described in each of the above embodiments. However, the touch panel and the electronic device according to the present invention can be embodied within the scope of the claims, even if they have configuration other than the above configuration.

For example, in the touch panel according to each of the above embodiments, the touch panel electrodes 31 are connected to the first connection terminals P-RX, and the touch panel electrodes 32 are connected to the second connection terminals P-TX of the touch detection circuit 17. However, the connection manner for the first connection terminals P-RX and the second connection terminals P-TX may be inverted. In addition, the first connection terminal of the pressure detection circuit 18 is not necessarily connected to the ground potential.

In addition, the electronic device according to the present invention is not limited to the above mobile electronic device. The present invention can be applied to a touch panel unit of a car navigation system, a touch panel unit of an automatic teller machine, and the like. In addition, the electronic device according to the present invention may be configured to detect a touch operation on any operation surface as well as the touch operation on the display surface. In such case, the touch panel may not have translucency.

The invention claimed is:

1. A touch panel, comprising:
a capacitive unit including first and second sets of touch panel electrodes separated by a dielectric flat film and lying in first and second planes, respectively, the individual electrodes of the second set extending parallel to one another with respective gaps located between adjacent touch panel electrodes of the second set; and
a pressure sensor unit including first and second sets of parallel pressure sensor electrodes separated by a piezoelectric flat film and lying in the second and a third plane, respectively, each pressure sensitive electrode of the first set being located in a respective one of the gaps between the individual touch panel electrodes of the second set, each pressure sensor electrode of the second set opposing a respective pressure sensitive electrode of the first set with the piezoelectric film located there between so as to define an opposing pair of pressure sensitive electrodes, each pressure sensitive electrode of the second set having a respective length and width, the length of each pressure sensitive electrode of the second set being longer than its width, none of the pressure sensitive electrodes of the second set overlapping any of the touch panel electrodes of the second set by more than ten percent of its width.

2. The touch panel according to claim 1, wherein there is a respective gap in the third plane between each adjacent pairs of second pressure sensor electrodes, each gap opposing a respective one of the second touch panel electrodes, and there is no active electrode formed in the gaps between the adjacent pairs of second pressure sensor electrodes.

3. The touch panel according to claim 1, wherein the first, second and third planes are parallel to one another.

4. The touch panel according to claim 1, wherein the first set of touch panel, electrodes run parallel to one another and perpendicular to the second set of touch panel electrodes.

5. The touch panel according to claim 1, wherein each of the second pressure sensor electrodes extends entirely across a respective one of the gaps between adjacent touch panel electrodes of the second set of touch panel electrodes.

6. The touch panel according to claim 1, further comprising a pressure detection circuit connected to the first and second sets of pressure sensor electrodes.

7. The touch panel according to claim 6, wherein one of the first and second sets of pressure sensitive electrodes are connected to a ground potential.

8. The touch panel according to claim 6, wherein at least two of the opposing pairs of pressure sensitive electrodes are coupled to the pressure detection circuit in parallel to one another.

9. The touch panel according to claim 1, wherein the piezoelectric film is rectangular in shape and extends in a longitudinal direction and a lateral direction and the first and second sets of pressure sensitive electrodes extend in the longitudinal direction.

10. The touch panel display of claim 9, further comprising first and second pressure detection circuits, a first plurality of opposing pairs of pressure sensitive electrodes being connected to the first pressure detection circuit, a second plurality of opposing pairs of pressure sensitive electrodes being connected to the second pressure detection circuit, the location of the first plurality of opposing pairs of pressure sensitive electrodes being closer to the middle of the piezoelectric film in the longitudinal direction than the location of the second plurality of pairs of pressure sensitive electrodes.

11. The touch panel according to claim 9, wherein the pressure sensor has a charge inversion region adjacent longitudinal ends of the rectangular piezoelectric film and wherein at least some of the second pressure sensitive electrodes located in the inversion region have sections with narrowed widths.

12. The touch panel according to claim 1, wherein the piezoelectric film is made of polylactic acid which has been subjected to a stretching process in at least uniaxial direction.

13. The touch panel according to claim 1, wherein the electrode width of each of the first pressure sensor electrodes is smaller than the electrode width of each of the second pressure sensor electrodes.

14. The touch panel according to claim 1, wherein the electrode width of each of the second pressure sensor electrodes is smaller than the electrode width of each of the first pressure sensor electrodes.

15. The touch panel according to claim 1, further comprising a ground electrode located in the second plane and between a respective adjacent pair of first pressure sensor and second touch panel electrodes.

16. The touch panel according to claim 1, wherein there is a respective gap between respective adjacent second pressure sensitive electrodes in the third plane, a respective dummy electrode located in each gap in the third plane such that each respective dummy electrode opposes a respective second touch panel electrode, each dummy electrode being electrically isolated from the other electrodes.

17. The touch panel according to claim 1, wherein the second set of touch panel electrodes are formed on a surface of a third film located between the dielectric and piezoelectric films.

18. The touch panel according to claim 17, wherein the second pressure sensor electrodes are formed on a fourth film located adjacent the piezoelectric film but not between the piezoelectric and dielectric films.

19. An electronic device comprising:
the touch panel according to claim 1, and
a control unit receiving an output from the touch panel as an operation signal.

20. A touch panel, comprising:
a capacitive unit including first and second sets of touch panel electrodes separated by a dielectric flat film and lying in first and second planes, respectively, the individual electrodes of the second set extending parallel to one another with respective gaps located between adjacent touch panel electrodes of the second set; and
a pressure sensor unit including first and second sets of parallel pressure sensor electrodes separated by a piezoelectric flat film and lying in the second and a third plane, respectively, each pressure sensitive electrode of the first set being located in a respective one of the gaps between the individual touch panel electrodes of the second set, each pressure sensor electrode of the second set extending parallel to the pressure sensitive electrodes of the first set and opposing a respective pressure sensitive electrode of the first set with the piezoelectric film located there between so as to define an opposing pair of pressure sensitive electrodes.

* * * * *